UNITED STATES PATENT OFFICE.

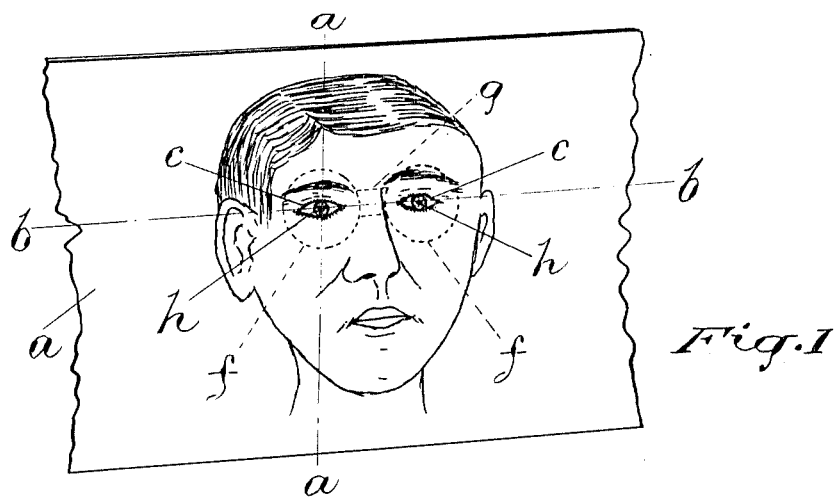
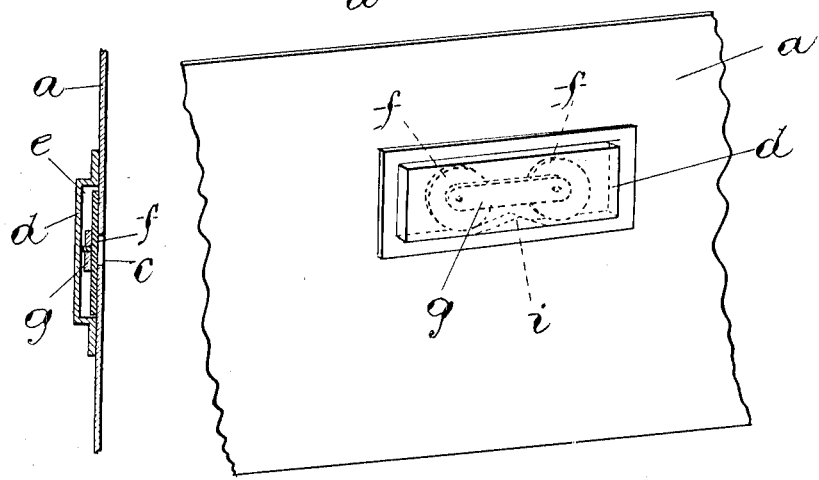
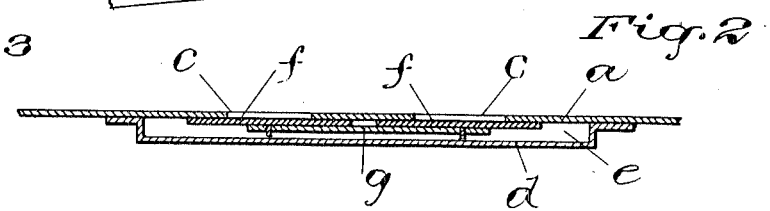

ARTHUR RUSSELL, OF TORONTO, ONTARIO, CANADA, ASSIGNOR TO JOHN A. PHIN, OF TORONTO, ONTARIO, CANADA.

ADVERTISING DEVICE.

1,118,370.	Specification of Letters Patent.	Patented Nov. 24, 1914.

Application filed July 10, 1914. Serial No. 850,278.

*To all whom it may concern:*

Be it known that I, ARTHUR RUSSELL, of the city of Toronto, in the county of York and Province of Ontario, Canada, having invented a new and useful Improvement in Advertising Devices, do hereby declare that the following is a full, clear, and exact description of the same.

My device consists of a card or sheet of metal having depicted thereon the facial imprint of a person or animal with movable eyes for the purpose of changing the expression and attracting attention.

My device is especially adapted to be used as an advertising medium in a railway car whereby the eyes alternate and change their position, automatically, by the motion of the car, especially when stopping and starting or when checking or increasing the speed.

A picture or portrait will attract attention by the eyes, and where the eyes are adapted to adjust, the expression changes. It is for the purpose of changing expression I have devised a means whereby the eye will automatically travel from side to side when situated where motion or vibration of any kind takes place.

The device consists of a sheet of cardboard or metal having embossed or imprinted thereon the facial view of a person or animal.

I make no claim to the illustration as various views may be utilized. The essential feature will be in having the outlines of the eyes cut away.

On the obverse side of the metal or card adjacent with the cut away eyes are disks with the eyes pictured thereon, one disk being adapted for each eye. The disks are coupled together to travel in unison backwardly and forwardly by the action of the motion of the car. As they travel sidewise each eye will be changed to correspond with each other that the person may be represented to look from either corner of the eye. The disks on which the eyes are pictured are maintained against the opening of the eye and retained in place by a pocket or shield cemented or fastened to the back of the sheet to prevent their becoming misplaced and to regulate the lateral travel.

In the drawings:—Figure 1 is a full face view of a person showing the movable eyes in dotted lines; Fig. 2 is a back view of Fig. 1; Fig. 3 is a vertical section on lines $a$—$a$; Fig. 4 is a cross-sectional view on lines $b$—$b$ Fig. 1.

Like letters refer to like parts throughout the specification and drawings.

Depicted on a sheet $a$ of card, metal, or composition is a facial imprint of a person having the eyes cut out to provide eye openings $c$. The facial view may also be embossed or attached to the sheet $a$ in the form of a mask for the purpose.

Cemented to the back of card adjacent with the eye openings is an extra sheet of card $d$ formed to provide a pocket $e$, or a shield to protect and maintain the movable eyes arranged against the eye openings $c$ through the card.

$f$—$f$ designates metal disks rotatably supported in the pocket $e$. The disks are coupled together by the tie-bar $g$ to cause them to travel in unison, each of the disks are loosely pivoted to the tie-bar whereby the disks are to be permitted to revolve when traveling backwardly and forwardly in the pocket $e$. Depicted on each of the disks on the face adjacent with the eye openings $c$ are eyes $h$ preferably situated in the center of the disks in alinement with the center of vision, so that when adjusted to either side of the face, the eyes will be caused to be adjusted to the corresponding corners of the eye openings.

This device is especially adapted to be used as an advertising medium and cause the effect of changing the expression by changing the position of the eyes, which may be brought about when the card $a$ is set up in some position whereby motion or jar occurs, such as happens in traveling railway cars or other traveling conveyances.

I may find in constructing the pocket or shield $e$ to partially incline the lower center section as in dotted lines at $i$, to partially impede the side travel of the disks.

The sides of the disks adjacent with the eye openings and upon which the pupils are depicted are white to correspond with the color of that part of the eye known as the eye ball.

What I claim as new and desire to secure by Letters Patent is:—

1. An advertising device, said device comprising a sheet of card or metal having a facial depiction thereon, the eye parts of said depiction cut through said sheet, a pocket or shield cemented or fastened against the back of said sheet, rotatable disks maintained in said pocket, said disks being coupled together and adapted to travel across said eye openings, eyes depicted upon said disks, as and for the purpose specified.

2. An advertising device, comprising a sheet of card or metal having a facial depiction thereon, eye openings through the said facial depiction, disks having eyes depicted thereon, said disks rotatably maintained against the back of said eye openings, said disks adapted to travel in unison across the said eye openings when subjected to vibration, as and for the purpose specified.

Signed at Toronto this 29th day of June, A. D. 1914.

ARTHUR RUSSELL.

In the presence of—
 NELLIE B. DYCE,
 N. J. MACMILLAN.